United States Patent Office 2,763,678
Patented Sept. 18, 1956

2,763,678

PREPARATION OF p-AMINOSALICYLIC ACID ESTERS THROUGH THE THIONYLAMINO-SALICYLIC ACID CHLORIDE

Walter Grimme, Moers-Utfort, Germany, assignor to Rheinpreussen Aktiengesellschaft fur Bergbau und Chemie, Homberg, Lower Rhine, Germany, a corporation of Germany No Drawing. Application September 3, 1953, Serial No. 378,427

Claims priority, application Germany September 5, 1952

11 Claims. (Cl. 260—471)

This invention relates to improvements in the preparation of p-aminosalicylic acid esters.

Esters of p-aminosalicylic acid are valuable pharmaceutical compounds. These esters have been prepared by reacting p-aminosalicylic acid with an alcohol such as an amino alcohol. Further known methods of preparation are the reaction of p-aminosalicylic acid with halogenated alcohols followed by reaction of the halogenalkyl esters of p-aminosalicylic acid with primary or secondary amines, and the interchange of the ester radicals of low molecular alkyl esters of p-aminosalicylic acid, as for example, the methyl or ethyl ester of p-aminosalicylic acid by means of higher alcohols such as n-butyl alcohol or amino alcohols such as diethylaminoethanol.

One object of this invention is a new simplified method for the preparation of p-aminosalicylic acid esters. This and still further objects will become apparent from the following description:

It has now been found that esters of p-aminosalicylic acid may be obtained in a simple manner if p-(thionyl-amino)-salicylic acid chloride is reacted with any desired alcohol or phenol and the corresponding ester formed is converted into the p-amino-compound by reaction with water with the splitting off of sulfur dioxide. Instead of water, diluted inorganic or organic acids may also be used.

It is advisable to use an excess of the alcohol or phenol and preferably twice the molar quantity of alcohol or phenol or still a larger excess.

The reaction between the p-(thionylamino)-salicylic acid chloride and the alcohol or phenol to form the ester is preferably effected in the presence of a solvent, which may consist of any organic liquid not reacting with p-thionylamino-salicylic acid chloride. Examples of such organic solvents include benzene, toluene, xylene, chlorobenzene, dioxane as well as the most varied aliphatic ethers such as diethyl ether, diisopropyl ether, or even mixed ethers such as methylethyl ether, methylpropyl ether, propylbutyl ether, etc.

Instead of effecting the reaction of the alcohol or phenol with the acid chloride in the presence of a special solvent, an excess of the ester forming component, i. e. the alcohol or phenol, may be used provided that this component is able to dissolve the p-thionylaminosalicylic acid chloride.

The reaction between the p-(thionylamino)-salicylic acid chloride and the alcohol or phenol must be effected at a temperature low enough to avoid self-condensation of the acid chloride. A temperature of about 20° C. has proven particularly suitable for the reaction and in any event, the temperature should not be allowed to rise above 40–50° C.

The aforesaid reaction is conveniently effected at atmospheric pressure. The use of vacuum or of increased pressure offers no advantage.

Any alcohol desired may be reacted with the acid chloride to form the ester such as aliphatic, aromatic or cyclo-aromatic alcohols, as for example, methyl alcohol, ethyl alcohol, n-propyl alcohol, isopropyl alcohol, n-butyl alcohol, tertiary butyl alcohol, hexyl alcohol, decyl alcohol, benzyl alcohol and cyclohexanol. Substituted alcohols such as ethylene-chlorhydrin or butylene-chlorhydrin and amino alcohols as for example, ethanolamine, diethyl-aminoethanol or dimethylamino-ethanol, propanolamine, etc. may also be used. In place of the alcohol any of the phenols such as phenol itself, resorcinol, nitrophenols, naphthols, etc. may be used for the reaction with the acid chloride.

It is often desirable to effect the esterification reaction between the acid chloride and the alcohol or phenol in the presence of pyridine. Pyridine not only acts as a solvent for the reaction but also acts to absorb the hydrogen chloride formed during the reaction. The use of pyridine is particularly advisable when using non-basic alcohols as esterification components. When using basic alcohols, the addition of special substances for the absorption of the hydrogen chloride vapors is not necessary inasmuch as in these cases, the hydrogen chloride reacts with the ester formed producing its hydro-chloride.

The reaction between the p-thionylaminosalicylic acid chloride and the alcohol or phenol to form the p-thionyl-amino-salicylic acid ester takes place in accordance with the following equation:

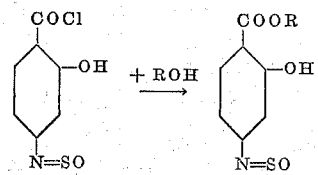

in which R is any hydrocarbon radical.

The ester of p-thionylaminosalicylic acid produced in accordance with the above reaction equation is thereupon decomposed by the addition of water or aqueous inorganic or organic acids. Examples of water-containing acids which may be used include hydrochloric acid, sulfuric acid, acetic acid. The reaction of p-thionylaminosalicylic acid ester with water or an aqueous acid causes the splitting off of sulfur dioxide and formation of the corresponding ester of p-aminosalicylic acid. The reaction of the p-thionylaminosalicylic acid ester with water is illustrated in the following equation:

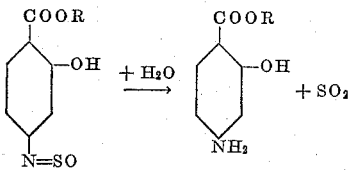

If a basic alcohol such as diethylaminoethanol or dimethylaminoethanol is used as an esterification component, the addition of an aqueous acid such as hydrochloric acid or sulfuric acid to the p-thionylamino-salicylic acid ester causes the immediate formation of the acid salt of the basic p-amino-salicylic acid ester as, for example, the hydrochloride or sulfate of this ester.

The p-thionylamino-salicyclic acid chloride mentioned in the foregoing specification is a novel compound and constitutes a highly valuable chemical intermediate for the production of the pharmaceutically valuable p-amino-salicylic acid esters according to this application.

For the production of p-thionylaminosalicyclic acid chloride 4-amino-2-hydroxy-benzoic acid or an anhydrous salt of this acid preferably an alkali salt, or mixtures of the free acid with any one of its salts, are heated with thionyl chloride to temperatures below 100° C. It is essential that the reaction mixture should be heated for a limited period only. At temperatures corresponding to the boiling point of thionyl chloride, for instance, the reaction time should not exceed 15 minutes. As a further essential measure, the presence of a diluent is necessary during the reaction. Excess quantities of the chlorinating agent itself or inert solvents, such as carbon tetrachloride, trichlorethylene, secondary butyl chloride, toluene or xylene may be employed as diluents. In the presence of such inert solvents, it is sufficient to effect the conversion with an equivalent amount of thionyl chloride at temperatures ranging from 60° to 80° C. in order to obtain good yields of 4-thionylamino-2-hydroxy-benzoyl chloride.

To obtain satisfactory yields, proper adjustment of temperature conditions, which depend in particular on the type of the diluent used, and of contact time is required. The higher the reaction temperature employed, the shorter the reaction time should be selected. When using an excess of thionyl chloride, it is particularly necessary to observe certain reaction time limits in order to obtain merely a chlorination of the carboxyl group, while the hydroxyl group remains unattacked.

When reacting free 4-amino-2-hydroxy-benzoic acid with thionyl chloride, part of the acid is always changed to its hydrochloride owing to the liberation of hydrogen chloride and will thus be withdrawn from the chlorination reaction, since 4-amino-2-hydroxy-benzoic acid hydrochloride is indifferent to chlorinating agents under the reaction conditions earlier described. If this formation of hydrochloride shall be eliminated or reduced, it is desirable to replace the free 4-amino-2-hydroxy-benzoic acid used as a starting material by a mixture of this acid with any one of its salts, preferably with one of its alkali salts. As shown by the equation:

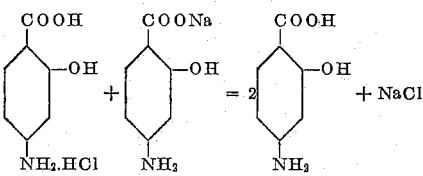

this measure will ensure the permanent presence of free acid which can react with further chlorinating agent. If however, the chlorination reaction is carried out without the addition of salts of 4-amino-2-hydroxy-benzoic acid, the 4-amino-2-hydroxy-benzoic acid hydrochloride formed as a by-product may be recovered and, by dissolving it in alkali or ammonia and precipitating with acids, such as hydrochloric acid, may easily be reconverted to 4-amino-2-hydroxy-benzoic acid which will then again be available for use in the chlorinating reaction. However, best yields are obtained when the 4-amino-2-hydroxy-benzoic acid is subjected to chlorination with thionyl chloride in the form of its salts, particularly of its alkali salts, while observing the reaction time and temperature conditions according to the rules mentioned above.

For purification, the crude p-thionylaminosalicyclic acid chloride is re-crystallized from an anhydrous inert solvent, such as toluene, secondary butyl chloride or carbon tetrachloride. The pure 4-thionylamino-2-hydroxy-benzoyl chloride is obtained in the form of light-yellow crystals having a fusing point of 78° C., which, without more ado, can be used for further conversions.

The production of the p-thionylaminosalicyclic acid chloride is illustrated in detail by the following example:

1.5 liters of thionyl chloride are heated to 70° C.; 251 grams of anhydrous sodium salt of 4-amino-2-hydroxy-benzoic acid are gradually added while stirring. After the first portions of the sodium salt are added, the reaction sets in whereupon heating is discontinued. The addition of the salt is so handled as to maintain a permanent vigorous reaction. After addition of the last portions, the reaction is allowed to continue for several minutes so that the total time of reaction will be 15 minutes. The precipitate is separated and the surplus thionyl chloride is removed from the filtrate under vacuum. There remains an orange-red residue consisting of fairly pure 4-thionyl-amino-2-hydroxy-benzoyl chloride. For purification, the product is re-crystallized from secondary butyl chloride or toluene. The fusing point of the light-yellow crystals is 78° C.

The following examples show the preparation of p-aminosalicyclic acid esters according to the present invention and are given by way of illustration and not of limitation:

*Example 1*

Into a round flask provided with a stirrer there is introduced a mixture of 18 grams diethylaminoethanol (0.154 mol.) and 100 cc. anhydrous toluene. Thereafter 12.9 grams 4-(thionylamino)-salicyclic acid chloride (0.063 mol) of a melting point of 78° C., dissolved in 200 cc. toluene, are added, drop by drop, while stirring and cooling in such a manner that the temperature of the reaction mixture does not exceed 20° C. After the addition of the entire quantity, crystals deposit which are removed from the toluene solution. By addition of aqueous hydrochloric acid to the clear solution, the hydrochloride of the p-aminosalicyclic acid-β-diethylaminoethyl ester is formed with the generation of sulfur dioxide. The toluene is separated from the watery layer, the latter is concentrated by evaporation. After cooling the hydrochloride of p-aminosalicyclic acid-β-diethylaminoethyl ester crystallizes. This product is then recrystallized from absolute ethyl alcohol or 90% isopropyl alcohol and has a melting point of 153–154° C.

*Example 2*

To a mixture of 22.25 grams (0.25 mol) dimethylaminoethanol and 100 cc. anhydrous toluene there is added, while stirring and cooling, a solution of 21.75 grams (0.1 mol) 4-(thionylamino)-salicylic acid chloride in 300 cc. toluene, drop by drop, so slowly that the temperature of the reaction mixture does not exceed 20° C. After the completion of the reaction, the toluene solution is freed from the crystalline precipitations and aqueous hydrochloric acid is added to the clear solution. The hydrochloride of p-aminosalicylic acid-β-dimethylaminoethyl ester is formed with evolution of sulfur dioxide. The reaction mixture is treated as shown in Example 1. For purification, the compound is recrystallized from 80% isopropanol and forms needles of a melting point of 218° C. (decomposition).

*Example 3*

Into 50 grams of molten phenol there are slowly stirred 21.7 grams finely pulverized 4-thionylamino-2-hydroxy-benzoyl chloride of a melting point of 78° C. causing the reaction mixture to heat up strongly. After cautious addition of 8 grams pyridine, the reaction mixture is allowed to continue reacting for 15 minutes at 60–70° C. and the reaction product is thereupon stirred into water. In this connection, sulfur dioxide is released and the product becomes noticeably lighter in color. After shaking several times with water, the crude ester is recrystallized from alcohol and water in the following way: the crude ester is dissolved in hot ethyl alcohol, whereupon water is added to the alcoholic solution until a cloud begins to form. Upon cooling, the ester crystallizes out. After twice recrystallizing from alcohol and water, the 4-amino-2-hydroxy-benzoic acid phenyl ester is obtained, in pure form. The melting point is 148°–149° C.

*Example 4*

21.7 grams (0.1 mol) finely pulverized p-(thionylamino)-salicylic acid chloride are added, while stirring and cooling, into 30 cc. n-butyl alcohol in such a manner that the temperature does not exceed 20° C. Thereupon 8 grams anhydrous pyridine are added, drop by drop, with cooling. After it has been set aside for some time so that the reaction may be completed, any crystals possibly present in the solution are filtered off. The alcoholic solution of the p-(thionylamino)-salicylic acid-n-butyl ester is freed from butyl alcohol under vacuum at moderate temperatures and the residue is decomposed with water, heating on a water bath to 60° C. Hereby, sulfur dioxide is released. The crude ester is separated from the water and recrystallized from alcohol and water. The melting point of the pure p-amino-salicylic acid-n-butyl ester is 93–94° C.

*Example 5*

To a mixture of 21 grams of undecyl alcohol and 100 cc. of anhydrous toluene, a solution of 11 grams of p-(thionylamino)-salicylic acid chloride in 150 cc. of anhydrous toluene is added while cautiously cooling and stirring. After stirring has been continued for two hours, the toluene solution is freed from any salt deposits by filtration and is decomposed with 500 cc. of water. Then the toluene solution is separated from the aqueous layer and is evaporated, by which operation a 92% yield of the undecyl ester of 4-amino-2-hydroxy-benzoic acid is obtained.

I claim:

1. Method for the preparation of p-amino-salicylic acid esters which comprises contacting at a temperature below 50° C. p-(thionylamino)-salicylic acid chloride with a member selected from the group consisting of alcohols and phenols, contacting the p-thionylaminosalicylic acid ester formed with water, thereby splitting off sulfur dioxide, and recovering a p-aminosalicylic acid ester.

2. Method according to claim 1 in which said contacting of said p-thionylaminosalicylic acid chloride and said group member is effected in the presence of a solvent non-reactive with said p-thionyl-amino-salicylic acid chloride.

3. Method according to claim 1 in which said contacting of said p-thionylaminosalicylic acid chloride and said group member is effected in the presence of pyridine.

4. Method according to claim 1 in which said p-thionyl-aminosalicylic acid chloride is contacted with an excess of said group member.

5. Method according to claim 1, in which said contacting of said p-thionylaminosalicylic acid chloride is effected at a temperature of about 20° C.

6. Method according to claim 1, in which the contacting of the formed p-thionyl-amino-salicylic ester is effected with water present in a dilute solution of an acid selected from the group consisting of hydrochloric acid, sulfuric acid, and acetic acid.

7. Method according to claim 1, in which said alcohol is a saturated aliphatic alcohol having up to 11 carbon atoms in its molecule.

8. Method according to claim 7, in which said alcohol is n-butyl alcohol.

9. Method according to claim 7, in which said alcohol is undecyl alcohol.

10. Method according to claim 1, in which said alcohol is dimethylaminoethanol.

11. As a new chemical compound p-(thionylamino)-salicylic acid chloride.

References Cited in the file of this patent

Beilstein, 14, 2nd supp., 271 (1951).